US005205933A

United States Patent [19]

Bernd

[11] Patent Number: 5,205,933

[45] Date of Patent: Apr. 27, 1993

[54] PUSHER CENTRIFUGE

[75] Inventor: Hoppe Bernd, Weiningen, Switzerland

[73] Assignee: Sulzer Escher Wyss AG, Zurich, Switzerland

[21] Appl. No.: 589,547

[22] Filed: Sep. 28, 1990

[30] Foreign Application Priority Data

Sep. 29, 1989 [CH] Switzerland .................... 03531/89-4

[51] Int. Cl.[5] .............................................. B01D 33/06

[52] U.S. Cl. ..................................... 210/374; 210/376

[58] Field of Search ............... 210/365, 370, 374, 376, 210/380.3

[56] References Cited

U.S. PATENT DOCUMENTS 4,209,405 6/1980 Christ ................................. 210/376

4,217,226 8/1980 Kampeen et al. ................... 210/376

4,889,627 12/1989 Hoppe .............................. 210/360.2

FOREIGN PATENT DOCUMENTS 1044721 4/1956 Fed. Rep. of Germany ...... 210/376

624858 8/1981 Switzerland .

0627376 1/1982 Switzerland .

*Primary Examiner*—Robert A. Dawson

*Assistant Examiner*—Matthew O. Savage

*Attorney, Agent, or Firm*—Sandler Greenblum Bernstein

[57] ABSTRACT

A pusher centrifuge which includes a housing and at least two screening drums for dewatering infed material. The screening drums and a pusher ring are mounted for rotary movement about a longitudinal axis. The pusher ring is further mounted for oscillatory movement, with respect to the longitudinal axis. During advancing movement of the pusher ring, the screening drums are rotated relative to each other about the longitudinal axis.

14 Claims, 1 Drawing Sheet

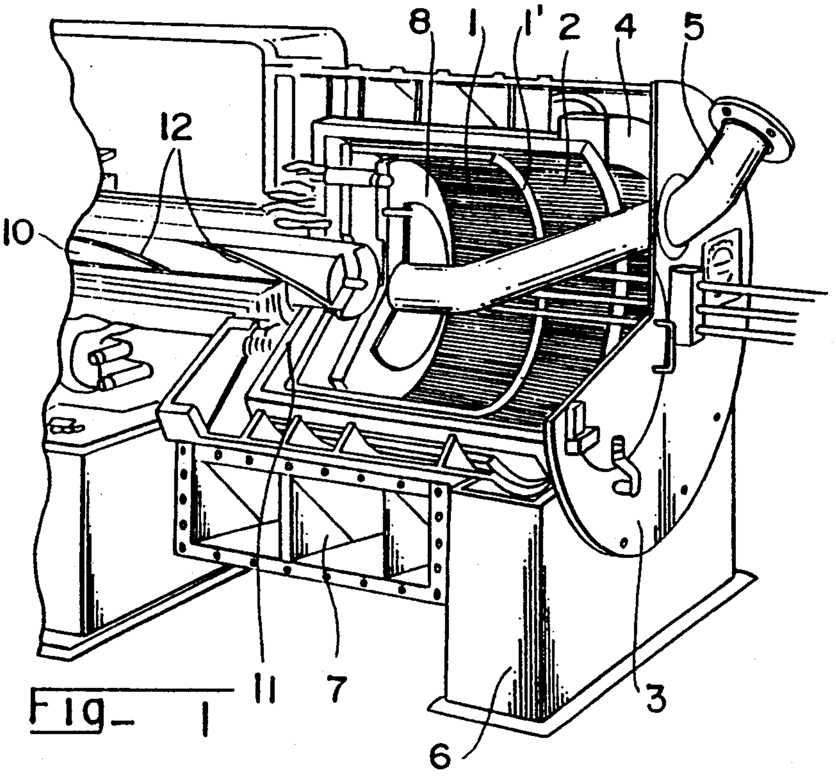
Fig- 1
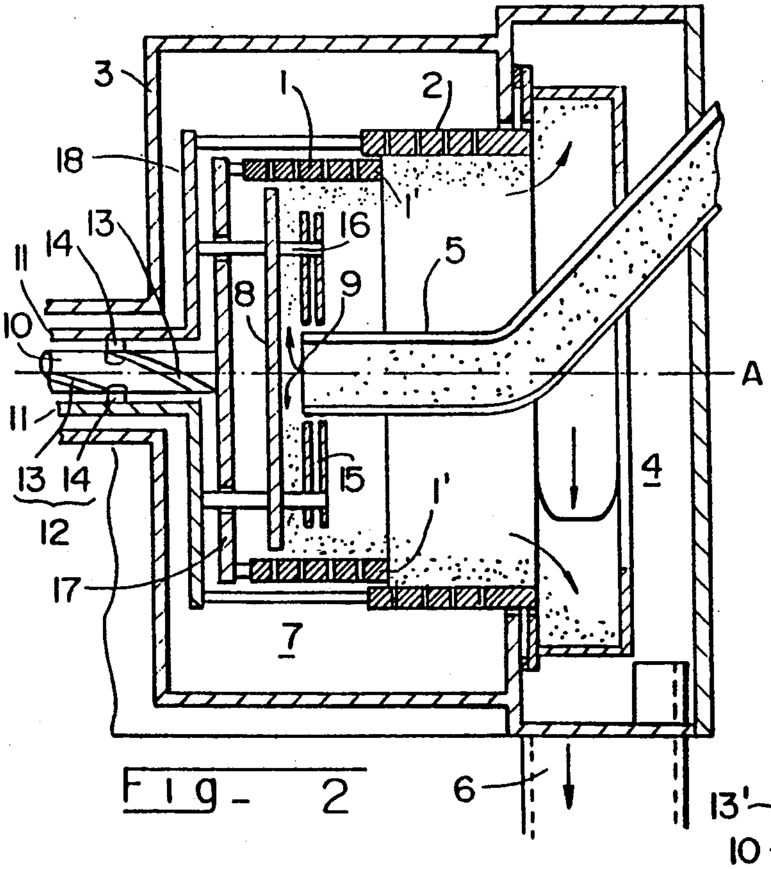
Fig- 2
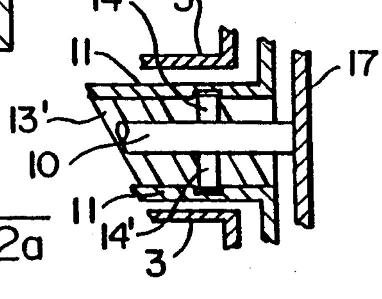
Fig-2a
Fig- 3a
Fig- 3b
Fig- 3c
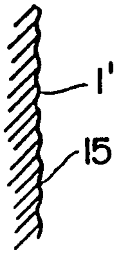
Fig- 3d

PUSHER CENTRIFUGE

BACKGROUND OF THE INVENTION

1. Field of the Invention

The present invention relates to a pusher centrifuge with at least two screening drums which rotate in a housing and in which material for centrifugation is fed into the interior at one end, and with at least one pusher ring between two screening drums, which carries out an oscillating movement in the axial direction of the screening drums to advance the partially dewatered centrifugation material on the interior of the following screening drum, in each case in the direction of a solid material outlet.

2. Description of Background and Other Information

Such pusher centrifuges are known from U.S. Pat. Nos. 4,217,226 and 4,209,405, and Swiss Patent Nos. 624,858 and 627,376, and serve for the continuous dewatering of material for centrifugation, in which the material is delivered via a feed pipe to the inner end of a centrifugation chamber and is dewatered successively on the inside of the screening drums. During this operation, the material to be centrifuged is gradually advanced in the direction of a solid material outlet by the oscillating movement in the axial direction of one or more pusher rings between adjacent screening drums, and at the same time material for centrifugation which has not been dewatered is added in the vicinity of the pusher base.

Such a pusher centrifuge has several screening drums, each pair of adjacent screening drums oscillate relative to one another in the axial direction and the edge of the inner screening drum in each case acts as a pusher ring. For example, in a two-stage centrifuge it is the drum, in a three-stage centrifuge the pusher base and the second drum, and in a four-stage centrifuge it is the first and third drums which oscillate in the axial direction.

With such a pusher centrifuge, continuous dewatering of material for centrifugation is possible, the material being gradually dewatered in the centrifugal field in the course of the advance on the inside of the screening drums from the material inlet to the solid material outlet and reaching the solid material outlet in a largely dewatered state, while the filtrate is forced outwardly through the screening drums and is drawn off there.

Especially in the case of high centrifugation material throughputs and fine grains, with such pusher centrifuges, caked layers form on the screening drums and do not change significantly during the advance toward the discharge. The solid cake which is formed becomes increasingly more compact and thus less permeable, so that the degree of dewatering and the residual moisture of the discharged solid material in the case of specific materials for centrifugation is still not ideal and necessitates a lengthening of the dewatering time and a higher rotation speed and a high energy consumption.

It has already been proposed that the cake of solid material which is formed during the dewatering operation should be loosened by inclined surface elements on the pusher rings, thus accelerating the dewatering. In the case of many materials for centrifugation, this measure leads to an improvement in the moisture extraction without increasing the speed of rotation of the screening drums and the residence time of the material for centrifugation. However, in the case of particularly delicate materials for centrifugation, the abrupt shearing movement of such pusher centrifuges gives rise to the danger of grain breakage and abrasion.

SUMMARY OF THE INVENTION

It is an object of the invention is to avoid the aforementioned disadvantages of the prior art and to create a pusher centrifuge which provides an increased degree of dewatering and a lower residual moisture of the discharged solid material, and which is also suitable for dewatering of particularly delicate material for centrifugation without the occurrence of grain breakage and abrasion.

This object is achieved according to the invention by the provision of a turning arrangement by means of which during the advance, the pusher ring simultaneously carries out a rotary movement about the axial direction of the screening drums.

By means of this lateral rotary movement of the pusher ring during the advancing operation, the cake of solid material is very gently broken by the lateral movement in the circumferential direction so that the dewatering capacity is improved. By suitable adjustment of the angle of rotation in each phase of the advance, this loosening can be carried out so gently that grain breakage is largely avoided.

The rotary movement can also take place particularly advantageously by oscillation, so that reverse rotation and breaking up take place even during withdrawal, which can be effected in a simple manner with helical guiding of the corresponding screening drum shafts against one another.

However, it is also possible to provide the rotary movement only during the advancing phase, while the withdrawal of the pusher ring takes place by a movement in the axial direction or another direction.

The relative rotary movement of the pusher ring can also be directed in the direction of rotation of the screening drums, which can be advantageous in the case of crystals which are susceptible to breaking, or also in the opposite direction. The latter can be important in the case of mixtures which are difficult to filter or low concentrations of solid material in the material for centrifugation.

In a specific embodiment of the present invention, the centrifuge includes:

- a housing;
- at least a first screening drum and a second screening drum, arranged in longitudinal succession, the screening drums being mounted for rotary movement about a longitudinal axis;
- at least one pusher ring mounted for rotary movement about the longitudinal axis;
- means for feeding material to be centrifuged into the housing;
- an outlet through which material exits from the housing;
- means for oscillating the pusher ring along the longitudinal axis for advancing the material towards the outlet along the inner surface of the second screening drum; and
- means for simultaneously rotating the pusher ring with respect to the inner surface of the second drum during the advancing of the material towards the outlet.

By means of the constructional configuration of this embodiment, the first screening drum is to be mounted for rotational and axial movement within the second screening drum.

Further according to the aforementioned embodiment of the invention, the means for oscillating the pusher ring includes means for oscillating the pusher ring between an advancing direction, in which the pusher ring is advanced toward the outlet, and a withdrawing direction, in which the pusher ring is withdrawn from the material outlet, the means for simultaneously rotating the pusher ring includes means for (i) rotating the pusher ring in a first rotary direction during oscillation in the advancing direction and (ii) rotating the pusher ring in a second, opposite, direction during oscillation in the withdrawing direction.

More specifically, the first screening drum has a forward end face comprising the pusher ring, the means for simultaneously rotating the pusher ring include (i) a shaft affixed to the first screening drum, the shaft having an axis coinciding with the longitudinal axis, and (ii) means for guiding the shaft of the first screening drum for helical movement about the longitudinal axis.

Still further, the means for simultaneously rotating the pusher ring further includes a tubular shaft affixed to the second screening drum, the tubular shaft having an axis coinciding with the longitudinal axis, and the means for guiding the shaft of the first screening drum for helical movement about the longitudinal axis further includes (i) a helical groove extending along one of the shaft of the first screening drum and the tubular shaft of the second screening drum and (ii) cams for engagement within the helical groove projecting from the other of the shaft of the first screening drum and the tubular shaft of the second screening drum.

More specifically, the shaft of the first screening drum has an outer periphery within which the helical groove is provided, and the tubular shaft of the second screening drum has an inner periphery upon which the cams are provided.

According to a particular embodiment of the invention, the means for simultaneously rotating the pusher ring includes means for rotating the pusher ring approximately 8° around the longitudinal axis during a complete axial stroke of the pusher ring, from an initial axial position to an advanced axial position in which the pusher ring is advanced toward the outlet.

According to another aspect of the invention, the pusher ring has a non-smooth surface. For example, the surface of the pusher ring can be roughened. Alternatively, the surface of the pusher ring can comprise radially extending grooves or serrations.

According to another object of the invention, the pusher centrifuge comprises: a housing provided with a solid material outlet; at least two screening drums having a lengthwise axis; the at least two screening drums being arranged in succession for rotation in a first direction within the housing; each screening drum having a respective inner surface; the two screening drums defining an internal chamber; means for infeeding material to be centrifuged into the internal chamber at an end region thereof; at least one pusher ring located between the at least screening drums; means for imparting an oscillating movement to the at least one pusher ring in the direction of the lengthwise axis of the at least two screening drums, to advance towards the solid material outlet partially dewatered material to be centrifuged, along the inner surface of a next following screening drum of the at least two screening drums of the at least two screening drums arranged in succession; means for simultaneously imposing a rotary movement on the at least one pusher ring about the lengthwise axis of the at least two screening drums during advance of the partially dewatered material towards the solid material outlet.

BRIEF DESCRIPTION OF THE DRAWINGS

The above and additional objects, characteristics, and advantages of the present invention will become apparent in the following detailed description of preferred embodiments, with reference to the accompanying drawings which are presented as non-limiting examples, in which:

FIG. 1 shows a partially cut-away pusher centrifuge in perspective view;

FIG. 2 shows the centrifuge in section along a longitudinal vertical plane along the axis of rotation;

FIG. 2*a* shows, in a partial view, an alternate embodiment of the invention; and FIGS. 3*a*–3*d* show, in cross-sectional view, various constructions of the surface of the pusher ring.

DETAILED DESCRIPTION OF PREFERRED EMBODIMENTS

The pusher centrifuge is shown in perspective and in section in FIGS. 1 and 2, respectively, and has a spinner unit consisting of two rotatable screening drums 1 and 2, having sieve openings therein, a stationary centrifuge housing 3 surrounding the screening drums, a solid material chamber 4 adjoining the spinner unit at the outlet, a feed pipe 5 which opens at the inner end of the spinner unit near a pusher base 8 with an inlet 9 for the material for centrifugation which is to be dewatered, a solid material outlet 6, and a fluid chamber 7 for the fluid which is spun out.

The inner screening drum 1 is mounted on a shaft 10 by means of which it can be set in rotation at a specific speed. At the same time, the shaft 10 is movable in the axial direction A and can also carry out an oscillating movement in the axial direction with a specific amplitude in addition to its rotation. The outer screening drum 2 is fixed on a hollow shaft 11 with which it can also be set in rotation, but without any oscillating movement in the axial direction. Other constructional details of the centrifuge can include those mentioned in aforementioned U.S. Pat. No. 4,217,226, the disclosure of which is hereby incorporated by reference for this purpose.

For example, the material to be centrifuged is fed from feed pipe 5 into a space between guide plate 15 and the pusher plate 8, and thereafter to screening drum 1, provided with sieve openings. Struts 16 connect the guide plate 15 to pusher plate 8. The shaft 10 of the inner screening drum 1 is fixed to the inner screening drum by means of an axle disk 17. The hollow shaft of the outer screening drum 2 is fixed to the outer screening drum by means of an axle disk 18.

Further, the shaft 10 of the inner screening drum is connected to the hollow shaft 11 of the outer screening drum by means of a screw guide 12. In the illustrated example, this consists of a number of helical grooves 13 on the outside of the shaft 10 in which a number of cams 14 on the inside of the hollow shaft 11 engage. The effect of this is that when the two screening drums 1 and 2 are displaced relative to one another in the axial direction, or when the inner shaft 10 is moved relative to the hollow shaft 11, the inner screening drum 1, and especially the pusher ring 1' thereof, necessarily carry out a rotary movement by a certain angle in addition to one advancing movement. Conversely, as shown in FIG. 2*a*, the cams 14' can also be provided on the outside of the shaft and the grooves 13' on the inside of the hollow shaft.

The pusher centrifuge described above is operated as follows. The material for centrifugation which is to be dewatered is introduced through the feed pipe 5 into the interior of the innermost screening drum 1 immediately adjoining the pusher base 8 and then flows radially outwardly onto the screening drum 1 where the dewatering process begins. By means of the oscillating screening drum 1, the partially dewatered material for centrifugation is advanced in the direction of the subsequent outer screening drum 2 and is further dewatered. In the meantime, further material for centrifugation which is to be dewatered is added through the feed pipe 5. When the partially dewatered material for centrifugation reaches the end of the inner screening drum 1, it is transported by the edge thereof, which acts as a pusher ring 1', onto the outer screening drum 2 and is dewatered further there. Finally, the centrifugation material which is fully dewatered is transported by the relative axial oscillation of the two screening drums 1 and 2 as far as the solid material chamber 4, which it leaves via the solid material outlet 6.

During the advancing operation, the cake which is already partially dewatered is gently broken up by the relative rotary movement about the axis A in the circumferential direction of the pusher ring 1' relative to the outer screening drum 2, so that the coarse-capillary fluid and the trapped fluid still contained in the partially dewatered cake is released without causing grain breakage, so that the dewatering is markedly improved. In addition, the movement along a helical line in any case has a greater dewatering effect because of the somewhat greater length. Equally, the cleaning effect with the cake broken up is markedly improved. Furthermore, imbalance in the centrifuge is avoided since the cake is reformed with each rotation, and thus equalized.

The degree of turning in the circumferential direction with a full stroke of the pusher ring should be adjusted according to the centrifugation material to be processed and should be chosen according to the need for careful treatment and the danger of grain breakage when the partially dewatered cake is being broken up. In an example of a two-stage centrifuge with a 630 mm maximum drum diameter for dewatering of, for example, $NaHCO_3$, a turn of approximately 8° was chosen with a rotation speed of 1400 revolutions/minute and 75 stroke movements of the pusher ring per minute of 60 mm amplitude. In this case, without increasing the rotation speed, the degree of dewatering of the $NaHCO_3$ at the solid material outlet was improved from approximately 13% to approximately 12% without any appearance of disruptive grain breakage. This means a reduction in the fluid component of almost 8%.

Although the subject matter of the invention has been described above on the basis of a construction with screw guiding and turning during the advance and reverse rotation on return of the pusher ring, other constructions with an analogous effect are also possible.

The additional rotary movement of the pusher ring can be carried out in the same direction as the rotation of the screening drums, screening drum 2 of the illustrated two-stage embodiment, which generally results in gentler treatment of the centrifugation material, which is advantageous particularly in the case of delicate, e.g., needle-shaped, crystals. However, with less delicate centrifugation material, the rotary movement of the pusher ring can also be provided in the opposite direction to the drum rotation.

The pusher ring 1' can be constructed with a relatively smooth surface, as shown in FIG. 3*a*, in which case the shearing movement of the centrifugation material is effected solely by the sliding friction occurring during the additional rotary movement. In this case, particularly gentle treatment of the centrifugation material is carried out. However, for improved entrainment of the centrifugation material by the pusher ring in the circumferential direction, the pusher ring can be provided on the surface With a certain micro-roughening, which is shown schematically in FIG. 3*b*. Even better entrainment is produced by a surface structure of the pusher ring 1' which deviates from a smooth circular surface, e.g., by the provision of radially extending grooves 15 on the pusher ring, as shown in FIG. 3*c*. For the treatment of certain products the edge of the pusher ring 1' can also be provided according to FIG. 3*d* with serrations with inclined pushing surfaces by means of which the breaking up of the cake of centrifugation material and the degree of dewatering can be further intensified.

Analogous conditions apply in the case of pusher centrifuges with more than two stages. Thus, in a three-stage centrifuge, the pusher base and the second screening drum oscillate synchronously in the axial direction and simultaneously carry out a rotary movement, whereas in the case of four-stage pusher centrifuges this is done by the first and third drum.

Finally, although the invention has been described with reference of particular means, materials and embodiments, it is to be understood that the invention is not limited to the particulars disclosed and extends to all equivalents within the scope of the claims.

What is claimed is:

1. A pusher centrifuge comprising:

(a) a housing;

(b) at least two screening drums, comprising a first screening drum and a second screening drum, arranged in longitudinal succession, said screening drums being mounted for rotary movement about a longitudinal axis, each of said screening drums having a respective inner surface, said first screening drum being positioned within said second screening drum for movement along said inner surface of said second screening drum;

(c) at least one pusher ring mounted for rotary movement about within said second screening drum said longitudinal axis, said pusher ring having a surface facing axially of said longitudinal axis;

(d) means for feeding material to be centrifuged into said housing proximate an end of said first screening drum;

(e) an outlet through which material exits from said housing proximate an end of a said screening drum remote from said end of said first screening drum, said surface of said pusher ring facing in a direction toward said outlet;

(f) means for oscillating said pusher ring along said longitudinal axis , for advancing said material towards said outlet along said inner surface of said second screening drum; and (g) means for simultaneously rotating said pusher ring with respect to said inner surface of said second screening drum during said advancing of said material toward said outlet.

2. A pusher centrifuge according to claim 1, said means for oscillating said pusher ring comprising oscillating said pusher ring between an advancing direction, in which said pusher ring is advanced toward said outlet, and a withdrawing direction, in which said pusher ring is withdrawn from said material outlet, said means for simultaneously rotating said pusher ring comprising means for (i) rotating said pusher ring in a first rotary direction during oscillation in said advancing direction and (ii) rotating said pusher ring in a second, opposite, direction during oscillation in said withdrawing direction.

3. A pusher centrifuge according to claim 1, said first screening drum having a forward end face comprising said pusher ring, said means for simultaneously rotating said pusher ring comprising (i) a shaft affixed to said first screening drum, said shaft having an axis coinciding with said longitudinal axis, and (ii) means for guiding said shaft of said first screening drum for helical movement about said longitudinal axis.

4. A pusher centrifuge according to claim 3, said means for simultaneously rotating said pusher ring further comprising a tubular shaft affixed to said second screening drum, said tubular shaft having an axis coinciding with said longitudinal axis, and said means for guiding said shaft of said first screening drum for helical movement about said longitudinal axis further comprising (i) helical groove extending along one of said shaft of said first screening drum and said tubular shaft of said second screening drum and (ii) cams for engagement within said helical groove projecting from the other of one of said shaft of said first screening drum and said tubular shaft of said second screening drum.

5. A pusher centrifuge according to claim 4, said shaft of said first screening drum having an outer periphery within which said helical groove is provided, and said tubular shaft of said second screening drum having an inner periphery upon which said cams are provided.

6. A pusher centrifuge according to claim 1, said surface of said pusher ring being non-smooth.

7. A pusher centrifuge according to claim 1, said surfce of said pusher ring being roughened.

8. A pusher centrifuge according to claim 1, said surface of said pusher ring comprising radially extending grooves.

9. A pusher centrifuge according to claim 1, said surface of said pusher ring comprising serrations with inclined pushing surfaces.

10. A pusher centrifuge according to claim 1, said first screening drum being mounted for rotational and axial movement within said second screening drum.

11. A pusher centrifuge according to claim 1, said means for simultaneously rotating said pusher ring comprising rotating said pusher ring approximately 8° around said longitudinal axis during a complete axial stroke of said pusher plate, from an initial axial position to an advanced axial position in which said pusher plate is advanced toward said outlet.

12. A pusher centrifuge comprising:

a housing provided with a solid material outlet;

at least two screening drums having a common axis of rotation;

said at least two screening drums being arranged in succession for rotation in a first direction within said housing about said axis of rotation;

each screening drum having a respective inner surface, said at least two screening drums comprising a first screening drum positioned within a second screening drum for movement along said inner surface of said second screening drum;

said two screening drums defining an internal chamber;

means for infeeding material to be centrifuged into said internal chamber at an end region thereof;

at least one pusher ring located at said inner surface of one of said second screening drum;

means for imparting an oscillating movement to the at least one pusher ring in the direction of said axis of said at least two screening drums, to advance towards said solid material outlet partially dewatered material to be centrifuged, along said inner surface of a next following screening drum of said at least two screening drums arranged in succession; and means for simultaneously imposing a rotary movement on said at least one pusher ring, with respect to said inner surface of said second screening drum, about said axis of said at least two screening drums during said oscillating movement of said at least one pusher ring.

13. A pusher centrifuge according to claim 12, said first and second screening drums having respective outer ends that are axially displaced relative to one another, said pusher ring being position axially between said respective outer ends of said first and second screening drums.

14. A pusher centrifuge comprising:

a housing;

two screening drums, comprising a first screening drum and a second screening drum, arranged in longitudinal succession, said screening drums being mounted for rotary movement about a longitudinal axis, each of said screening drums having a respective inner surface, at least a portion of said first screening drum positioned within at least a portion of said second screening drum;

a pusher ring mounted for rotary movement about said longitudinal axis, said pusher ring comprising an end portion of said first screening drum;

an inlet pipe for feeding material to be centrifuged into said housing;

an outlet through which material exits from said housing;

means for transmitting oscillatory movement to said pusher ring along said longitudinal axis, for advancing said material towards said outlet along said inner surface of said second screening drum; and means for rotating said pusher ring with respect to said inner surface of said second screening drum during said advancing of said material toward said outlet.

* * * * *